(12) United States Patent
Ireland et al.

(10) Patent No.: US 8,294,959 B2
(45) Date of Patent: Oct. 23, 2012

(54) ELECTRONIC DOCUMENT UPDATE BASED ON HANDWRITTEN EDITS

(75) Inventors: Claire Dawn Ireland, Cambridgeshire (GB); Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 805 days.

(21) Appl. No.: 12/356,952

(22) Filed: Jan. 21, 2009

(65) Prior Publication Data
US 2010/0182653 A1 Jul. 22, 2010

(51) Int. Cl.
*H04N 1/04* (2006.01)
(52) U.S. Cl. .......................... 358/474; 715/271; 382/164
(58) Field of Classification Search .................. None
See application file for complete search history.

(56) References Cited

U.S. PATENT DOCUMENTS

| 4,777,510 A | * | 10/1988 | Russel | 399/184 |
| 2007/0253620 A1 | * | 11/2007 | Nagarajan et al. | 382/164 |

OTHER PUBLICATIONS

U.S. Appl. No. 12/175,815 to Nagarajan filed on Jul. 18, 2008.

* cited by examiner

*Primary Examiner* — Twyler Haskins
*Assistant Examiner* — Christopher D Wait
(74) *Attorney, Agent, or Firm* — Oliff & Berridge, PLC (57) ABSTRACT

An automated system and method for recognizing handwritten edits contained on a hard-copy document, the hand-written edits being made in one of two colors, and creating an electronic version of the hard-copy document with the edits applied, the edits being applied according to the highlighted color of the edit.

13 Claims, 6 Drawing Sheets

THE COW JUMPED OVER THE BARN

FIG. 9A

THE COW JUMPED OVER THE BARN
RED

ELECTRONIC DOCUMENT UPDATE BASED ON HANDWRITTEN EDITS

BACKGROUND

Many workflows today still rely on hardcopy documents, and users are still accustomed to marking up hardcopy documents for highlighting areas of interest, annotating information, editing, etc. In the legal industry, for example, lawyers receive stacks of cases that they mark up, edit, revise, and have their assistants make copies of to be distributed to other lawyers or their clients. In many instances, there are significant costs associated with the time and expense required to manually incorporate these handwritten annotations into an electronic document.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

One aspect of the present exemplary embodiments is to provide a quick and inexpensive process of electronically incorporating handwritten edits in a hard-copy document into an electronic document. Specifically, one aspect of the present disclosure provides an automated system for recognizing hand-written edits contained on a hard-copy document and creating an electronic version of the hard-copy document with the edits applied.

It is another aspect of the present exemplary embodiments to provide a method of creating an electronic document from a hard-copy document, the method including: electronically reading the hard-copy document that includes a highlighted edited region, at least one of extracting, moving or adding the highlighted region based on predetermined criteria, and outputting the electronic document after the at least one of extracting, moving, or adding is accompli shed.

It is another aspect of the present exemplary embodiments to provide a method for recognizing the highlighted edited region and determining whether the highlighted edited region is a region of original text to be extracted or moved, or a region of new text to be added.

It is another aspect of the present exemplary embodiments to provide a method for recognizing the highlighted edited region and determining whether the highlighted edited region is a region of original text to be extracted or moved, or a region of new text to be added, wherein the region of original text to be extracted or moved is highlighted in a first color, and the region of new text to be added is highlighted in a second color.

It is another aspect of the present exemplary embodiments to provide a method for electronically reading the hard-copy document that includes a highlighted edited region; at least one of extracting, moving or adding the highlighted region based on predetermined criteria; and outputting the electronic document after the at least one of extracting, moving, or adding is accomplished, wherein the highlighted edited region is disposed at any location on the hard-copy document.

It is another aspect of the present exemplary embodiments to provide a method for electronically reading the hard-copy document that includes a highlighted edited region; at least one of extracting, moving or adding the highlighted region based on predetermined criteria; and outputting the electronic document after the at least one of extracting, moving, or adding is accomplished, wherein the hard-copy document has a section that includes the highlighted edited region, and only the section is outputted after the at least one of extracting, moving or adding is accomplished.

It is another aspect of the present exemplary embodiments to provide a method of creating an electronic document from a hard-copy document, the method including: electronically reading the hard-copy document that includes a highlighted edited region, at least one of extracting, moving or adding the highlighted region based on predetermined criteria, and outputting the electronic document after the at least one of extracting, moving, or adding is accomplished, and recognizing the highlighted edited region and determining whether the highlighted edited region is a region of original text to be extracted or moved, or a region of new text to be added, wherein the region of original text to be extracted or moved is highlighted in a first color, and the region of new text to be added is highlighted in a second color, and wherein the outputted electronic document contains text in the second color, the text in the second color representing text that was highlighted in the second color.

It is another aspect of the present exemplary embodiments to provide a method of creating an electronic document from a hard-copy document, the method including: electronically reading the hard-copy document that includes a highlighted edited region, at least one of extracting, moving or adding the highlighted region based on predetermined criteria, and outputting the electronic document after the at least one of extracting, moving, or adding is accomplished, and recognizing the highlighted edited region and determining whether the highlighted edited region is a region of original text to be extracted or moved, or a region of new text to be added, wherein the region of original text to be extracted or moved is highlighted in a first color, and the region of new text to be added is highlighted in a second color, wherein when the highlighted edited region is ambiguous, the outputted electronic document contains text in the first color and text in the second color, the text in the first color representing text that was highlighted in the first color, the text in the second color representing text that was highlighted in the second color.

It is another aspect of the present exemplary embodiments to provide a method of creating an electronic document from a hard-copy document, the method including: electronically reading the hard-copy document that includes a highlighted edited region, at least one of extracting, moving or adding the highlighted region based on predetermined criteria, and outputting the electronic document after the at least one of extracting, moving, or adding is accomplished, and recognizing the highlighted edited region and determining whether the highlighted edited region is a region of original text to be extracted or moved, or a region of new text to be added, wherein the region of original text to be extracted or moved is highlighted in a first color, and the region of new text to be added is highlighted in a second color, and determining whether the highlighted edited region is a region of original diagrams to be extracted or moved or a region of new diagrams to be added.

It is another aspect of the present exemplary embodiments to provide a method of creating an electronic document from a hard-copy document, the method including: electronically reading the hard-copy document that includes a highlighted edited region, at least one of extracting, moving or adding the highlighted region based on predetermined criteria, and outputting the electronic document after the at least one of extracting, moving, or adding is accomplished, and recognizing the highlighted edited region and determining whether the highlighted edited region is a region of original text to be extracted or moved, or a region of new text to be added, wherein the region of original text to be extracted or moved is highlighted in a first color, and the region of new text to be added is highlighted in a second color, and determining whether the highlighted edited region is a region of original diagrams to be extracted or moved or a region of new diagrams to be added, wherein the region of original diagrams to be extracted or moved is highlighted in a first color, and the region of new diagrams to be added is highlighted in a second color.

DETAILED DESCRIPTION

A detailed description of the exemplary embodiments will now be described with reference to the Figures.

Figure 1:
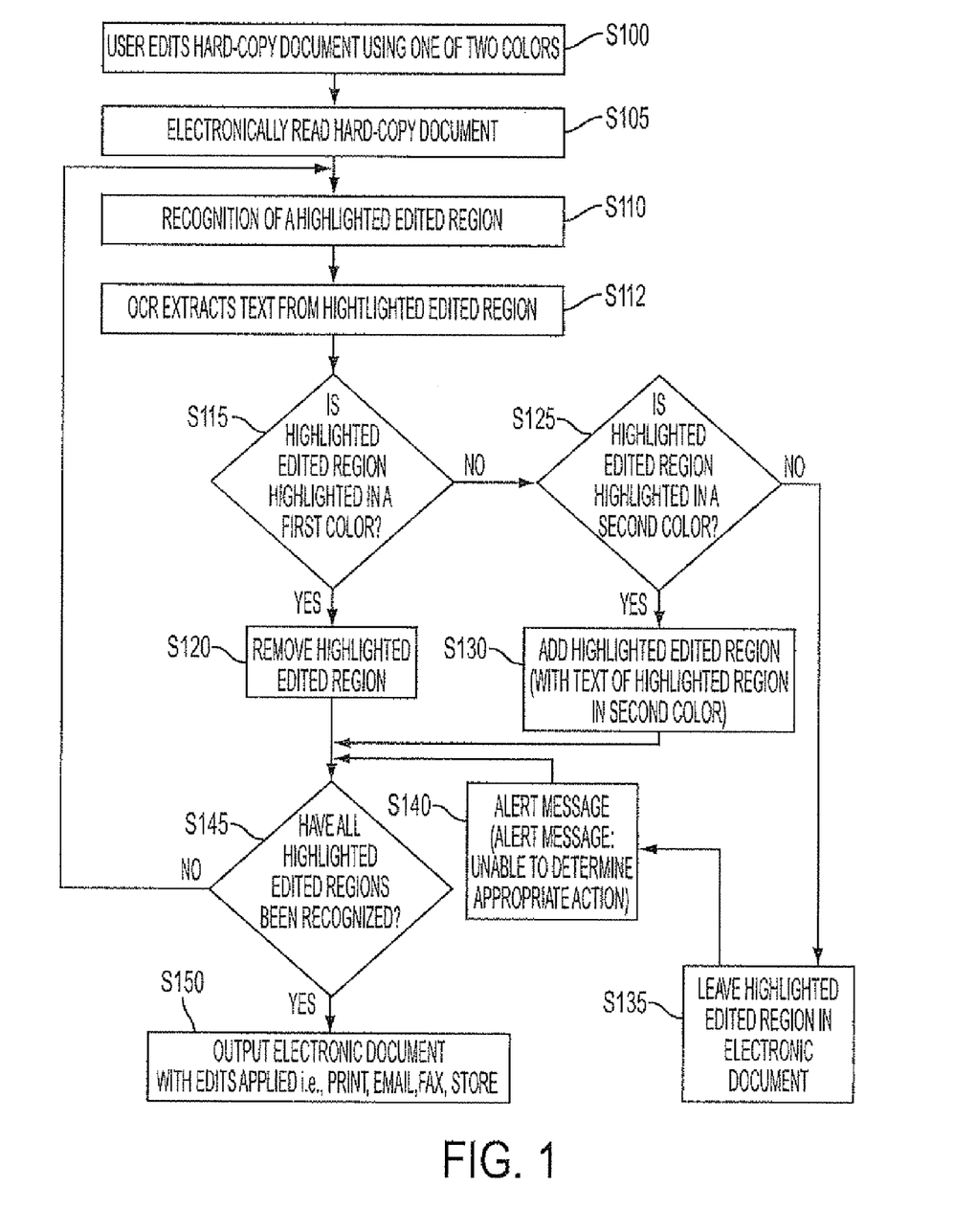
FIG. 1 is a flow-chart showing stages of creating an electronic document from a hard-copy document, in accordance with an exemplary embodiment.

Referring now to FIG. 1, a user provides a hard-copy document that has been edited by highlighting regions of original text to be deleted in a first of two colors and highlighting regions of new text to be added in a second of two colors as shown at S100. The hard-copy document is electronically read by an image processing device, as shown in S105, for example, a digital scanner, to create an electronic document. Although one exemplary embodiment includes a digital scanner, any device that can electronically read a document may be implemented.

As shown in S110, a data processing apparatus recognizes an initial highlighted edited region, or a first highlighted edited region, of a possible plurality of highlighted edited regions, in the electronic document by methods disclosed in U.S. Patent Application Publication No. 2007/0253620, which is hereby incorporated by reference. The data processing apparatus may include an image processing device, or any other device that can recognize a highlighted edited region.

Upon the condition that the highlighted edited region has been recognized, the data-processing apparatus may, for example, utilize an Optical Character Recognition (OCR) system to extract the text contained in the highlighted edited region, as shown at S112.

Upon the condition that the text within the highlighted edited region has been extracted, the data-processing apparatus determines, as shown at S115, whether or not the highlighted edited region is highlighted in a first predetermined color. If the highlighted edited region has been highlighted in the first color, the text extracted from within the highlighted edited region is deleted or removed from the electronic document, as shown at S120.

However, if the data-processing apparatus determines, for example, as shown at S115, that the highlighted edited region is not highlighted in the first color, then the data-processing apparatus determines, as shown at S125 whether or not the highlighted edited region is highlighted in a second predetermined color. If the highlighted edited region has been highlighted in the second color, then the text extracted from within the highlighted edited region may be added to the electronic document, as shown at S130. Moreover, when the data processing apparatus adds the text extracted from the highlighted edited region to the electronic document, as shown at S130, the data processing apparatus may also add color to the text such that the text itself appears in the second color.

However, if the data-processing apparatus determines, as shown at S125 that the highlighted edited region has not been highlighted in the second color, then the data-processing apparatus leaves the highlighted edited region in the electronic document as it was read from the hard-copy document by the image processing device, as shown at S135. Then the data-processing apparatus may insert an alert message, such as "Attention: unable to determine appropriate action for this highlighted region," as shown at S140. The data-processing apparatus inserts the alert message into the electronic document directly after the highlighted edited region in question (i.e., the region that has been determined, as shown at S115 and S125, respectively, not to be highlighted in either the first or second predetermined colors).

Upon the condition that the text extracted from the initial highlighted edited region has been deleted from (as shown at S120), added to (as shown at S130), or left in (as shown at S135) the electronic document, the data-processing apparatus determines whether all the highlighted edited regions have been processed, as shown at S145. If the data-processing apparatus determines that another highlighted edited region has not been processed, then the data-processing apparatus returns to step 10 and repeats steps 110 through 145 for each remaining highlighted edited region that remains unprocessed.

On the other hand, if the data-processing apparatus determines that all of the highlighted edited regions have been processed, as shown at S145, then the data-processing apparatus outputs the entire electronic document having the appropriate edits applied, as shown at S50.

Additionally, as shown at S150, the data processing apparatus may output only the pages of the electronic document that have had edits applied to them. For example, if a hard-copy document containing 100 pages is read by the image processing device and the data-processing apparatus recognizes that, for example, only pages 3, 17, 45, 66 and 82 contain highlighted edited regions to be deleted or added, then, after processing the highlighted edited regions, as shown at S110 through S145, the data-processing apparatus, as shown at S150, outputs only pages 3, 17, 45, 66 and 82 of the electronic document with the edits applied. Thus, according to this example, it is possible for only 5 of the 100 pages read by the image processing device to be output as the electronic document. In other words, it is possible for the data processing device to output only those pages that have had edits applied to them.

It will be appreciated by those skilled in the art that the entire outputted electronic document, or, alternatively, only the pages thereof that have had edits applied to them, can thereafter be processed by any means necessary under the particular circumstances of the individual user, for example, attaching and sending in an e-mail, sending by facsimile, storing on a storage medium, sending to an internet server, displaying on an image display device, or sending to a printing apparatus for printing.

Moreover, a revision control system (RCS), as described in U.S. patent application Ser. No. 12/175,815, which is hereby incorporated by reference, may be implemented to manage and store the electronic documents, both before and after edits are applied. The RCS may be implemented to manage and store the original electronic document read by the image processing device, the entire outputted electronic document after edits are applied, or particular pages of the outputted electronic document that have had edits applied to them, such that the documents can be stored, retrieved, edited as determined by the user, and newer versions placed under revision control as the case may be. Also, the RCS uses techniques to identify and track the differences between document revisions to thus maintain a revision history of the document.

Figure 2:
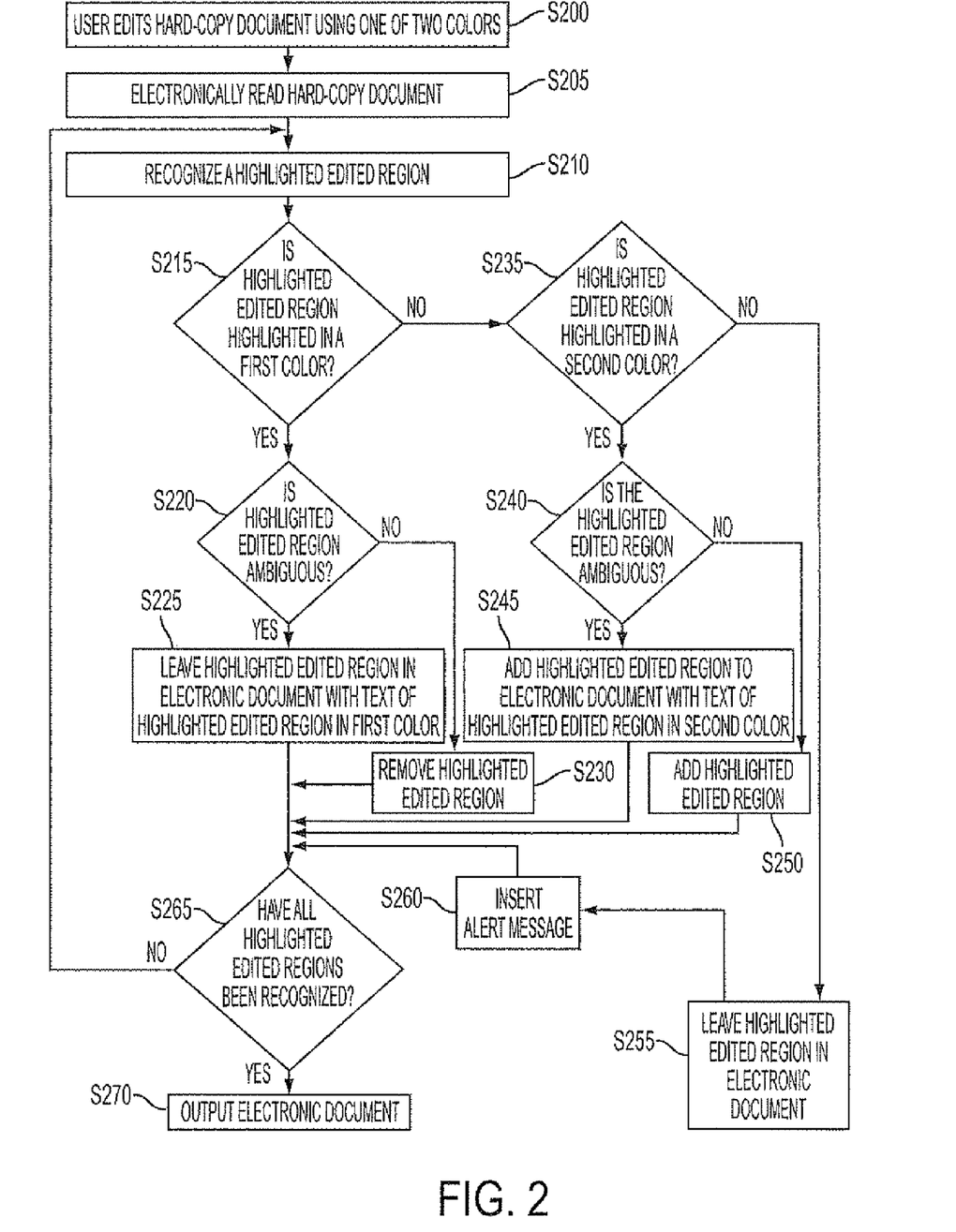
FIG. 2 is a flow-chart showing stages of creating an electronic document from a hard-copy document, in accordance with another exemplary embodiment.

Referring now to FIG. 2, a user may provide a hard-copy document, as shown at S200, that has been edited by highlighting regions of original text to be deleted in a first of two colors and highlighting regions of new text to be added in a second of two colors. The hard-copy document may then be read by an image processing device, as shown at S205. The image-processing device may be, for example, a digital scanner used to create an electronic document.

As shown at S210, a data processing apparatus, which could include the image processing device, recognizes an initial highlighted edited region, or a first highlighted edited region, of a possible plurality of highlighted edited regions, in the electronic document by methods described within U.S. Patent Application Publication No. 2007/0253620, which is hereby incorporated by reference.

Upon the condition that the highlighted edited region has been recognized, the data-processing apparatus can utilize an Optical Character Recognition (OCR) system to extract the text contained in the highlighted edited region, as shown in S212.

Upon the condition that the text within the highlighted edited region has been extracted, the data-processing apparatus determines, as shown at S215, whether or not the highlighted edited region is highlighted in a first predetermined color. If the highlighted edited region has been highlighted in the first color, the data-processing apparatus determines, as shown at S220 whether or not the highlighted edited region is ambiguous. In other words, as is explained in reference to FIG. 9A below, the data-processing apparatus determines if the highlighted edited region highlighted in the first color contains only fragments or partial sections of words, letters, phrases, or figures, thereby introducing ambiguity into the system.

If, on the other hand, the data-processing unit determines that there is no ambiguity in the highlighted edited region, the data-processing unit, as shown at S230, removes the text extracted from within the highlighted edited region from the electronic document.

If it determined that the highlighted edited region is not highlighted in the first color, as shown in S215, then the data-processing unit proceeds, as shown in S235, to determine if the highlighted edited region is highlighted in a second predetermined color. If the highlighted edited region is highlighted in the second color, the data-processing apparatus determines, as shown at S240 whether or not the highlighted edited region is ambiguous. As mentioned above, ambiguity can be introduced into the system if the highlighted edited region highlighted in the second color contains only fragments or partial sections of words, letters, phrases or figures, as is explained with reference to FIG. 9B below.

If, on the other hand, the data-processing unit determines, as shown in S240 that there is no ambiguity in the highlighted edited region, the data-processing unit adds the text extracted from within the highlighted edited region to the electronic document, as shown at S250.

If the data-processing unit determines that the highlighted edited region is not highlighted in the second predetermined color, as shown at S235, then the data-processing apparatus leaves the highlighted edited region in the electronic document, as shown at S250, as it was read from the hard-copy document by the image processing device, as shown at S205. Subsequently, the data-processing apparatus inserts an alert message, such as "Attention: unable to determine appropriate action for this highlighted region," as shown at S260. The data-processing apparatus then inserts the alert message into the electronic document directly after the highlighted edited region in question (i.e., the region that has been determined, as shown at S215 and S235, respectively, not to be highlighted in either the first or second predetermined colors).

Upon the condition that the text extracted from the initial highlighted edited region has been processed, the data-processing apparatus determines whether all of the highlighted edited regions have been processed, as shown at S265. If a remaining highlighted edited region has not been processed, then the data-processing apparatus returns to S210 and completes S210 through S260 for each remaining highlighted edited region that remains unprocessed.

On the other hand, if the data-processing apparatus determines that all of the highlighted edited regions have been processed, as shown at S265, then the data-processing apparatus outputs the entire electronic document having the appropriate edits applied, as shown at S270.

Additionally, at S270, the data processing apparatus may output only the pages of the electronic document that have had edits applied to them. As mentioned above, it is possible for the data-processing apparatus to output only those pages of the electronic document that have had edits applied.

As discussed previously, the user may then process the entire electronic document, or only the individual pages thereof that have had edits applied to them, as the user's circumstances may dictate.

Figure 3:
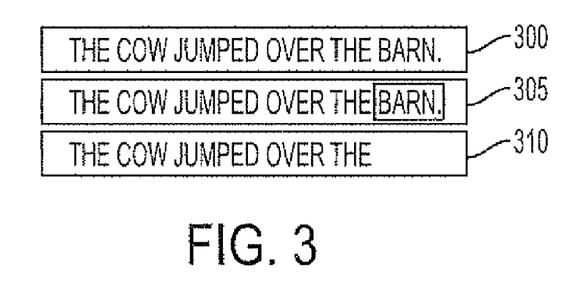
FIG. 3 illustrates an event diagram showing the results obtained by creating an electronic document with edits applied from a hard-copy document containing handwritten edits in an exemplary embodiment.

Referring now to FIG. 3, box 300 shows an example of a sentence contained in an original hard-copy document, Box 305 shows an example of the same sentence but with a portion of the sentence being highlighted in a first color (for the purposes of these figures, the solid lines indicate a first color) as a highlighted edited region to be removed. Box 310 shows the end result of reading a hard-copy document containing edits with an image processing device, recognizing a highlighted edited region in a first color, and applying the appropriate action, as explained, for example, in S100 through S120.

Figure 4:
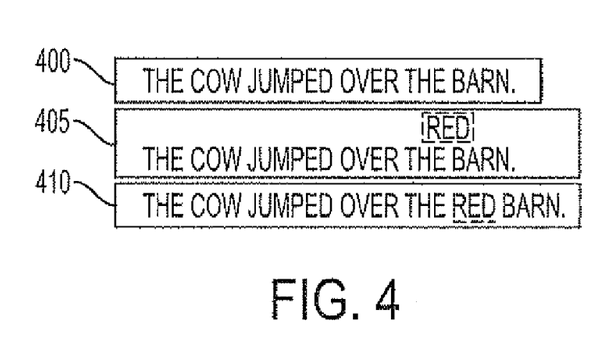
FIG. 4 illustrates an event diagram showing the results obtained by creating an electronic document with edits applied from a hard-copy document containing handwritten edits in another exemplary embodiment.

Referring now to FIG. 4, box 400 shows an example of a sentence contained in an original hard-copy document. Box 405 shows an example of the same sentence but with the user adding a word being highlighted in a second color (for the purposes of these figures, the dashed lines indicate a second color) as a highlighted edited region to be added. Box 410 shows the end result of reading a hard-copy document containing edits with an image processing device, recognizing a highlighted edited region in a second color, and applying the appropriate action, as explained, for example, in S100 to S115, S125 and S130.

Figure 5:
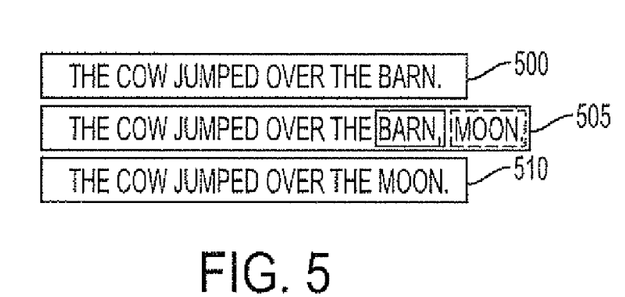
FIG. 5 illustrates an event diagram showing the results obtained by creating an electronic document with edits applied from a hard-copy document containing handwritten edits in another exemplary embodiment.

Referring now to FIG. 5, box 500 shows an example of a sentence contained in an original hard-copy document. Box 505 shows an example of the same sentence with a portion of the sentence being highlighted in a first color as a highlighted edited region to be removed, and with the user adding a word being highlighted in a second color as a highlighted edited region to be added. Box 510 shows the end result of reading a hard-copy document containing edits with an image processing device, recognizing a plurality of highlighted edited regions in either a first color or a second color, and applying the appropriate action, as explained, for example, in S100 to S130.

Figure 6:
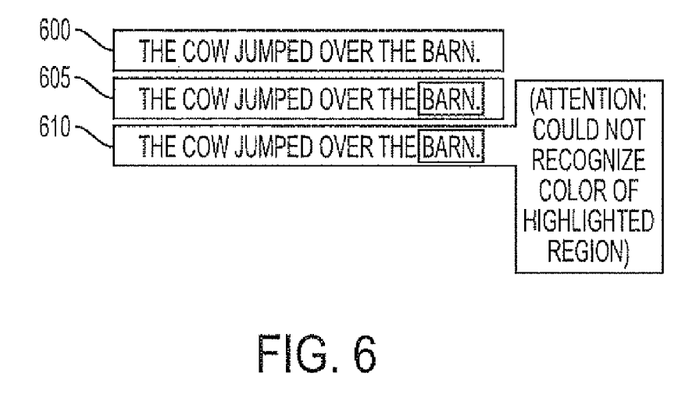
FIG. 6 illustrates an event diagram showing the results obtained by creating an electronic document with edits applied from a hard-copy document containing handwritten edits in another exemplary embodiment.

Referring now to FIG. 6, box 600 shows an example of a sentence contained in an original hard-copy document. Box 605 shows an example of the same sentence but with a portion of the sentence being highlighted in a first color as a highlighted edited region to be removed. Box 610 shows the end result of reading a hard-copy document containing edits with an image processing device, recognizing a highlighted edited region in a color other than a first or second color (i.e., a third color), and applying the appropriate action including inserting an alert message after the highlighted edited region in question, as explained, for example, in S100 through S140.

Figure 7:
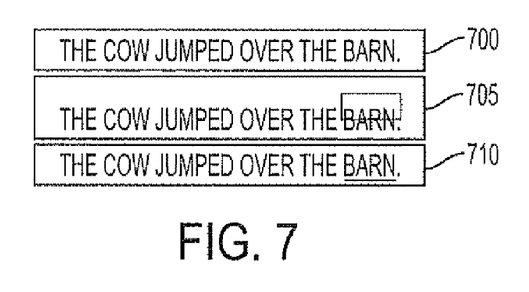
FIG. 7 illustrates an event diagram showing the results obtained by creating an electronic document with edits applied from a hard-copy document containing handwritten edits in another exemplary embodiment.

Referring now to FIG. 7, box 700 shows an example of a sentence contained in an original hard-copy document. Box 705 shows an example of the same sentence but with a portion of the sentence being highlighted in a first color as a highlighted edited region to be removed. Box 705 also provides an example of a highlighted edited region that includes only a partial portion of a word or words of a phrase, thus introducing ambiguity. Box 710 shows the end result of reading a hard-copy document containing edits with an image processing device, recognizing a highlighted edited region in a first color, recognizing ambiguity in the highlighted edited region highlighted in the first color, and, because of the ambiguity, leaving the extracted text from within the highlighted edited region in the electronic document, but colored in the first color (for purposes of these examples, the solid underline indicates the underlined word is colored in the first color), as explained, for example, in S200 through S225.

Figure 8:
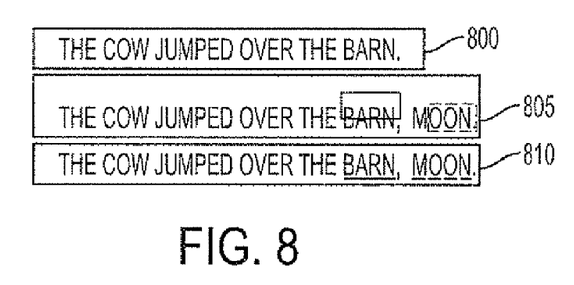
FIG. 8 illustrates an event diagram showing the results obtained by creating an electronic document with edits applied from a hard-copy document containing handwritten edits in another exemplary embodiment.

Referring now to FIG. 8, box 800 shows an example of a sentence contained in an original hard-copy document. Box 805 shows an example of the same sentence but with a portion of the sentence being highlighted in a first color as a highlighted edited region to be removed, and with the user adding a word being highlighted in a second color as a highlighted edited region to be added. Box 805 also provides an example of a plurality of highlighted edited regions that include only a partial portion of a word (or words of a phrase), thus introducing ambiguity. Box 810 shows the end result of reading a hard-copy document containing edits with an image processing device, recognizing a plurality of highlighted edited regions in either a first or second color, recognizing ambiguity in the highlighted edited regions, and, because of the ambiguity, leaving the extracted text from within the highlighted edited regions in the electronic document, but colored in the appropriate color, whether first or second (for purposes of these examples, a dashed underline indicates the underlined word is colored in the second color), as explained, for example, in steps S200 through S225 and S235 through S245.

Figure 9A:
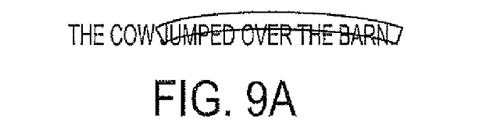
FIGS. 9A and 9B illustrate ambiguity in highlighting a highlighted edited region in an exemplary embodiment.

Referring now to FIG. 9A, a scenario is illustrated where a user attempts to edit the hard-copy document by highlighting the section to be removed (i.e., "jumped over the barn"), but inadvertently introduces ambiguity into the process by highlighting only fragments of a word or words within the section to be removed, instead of the entire word or words to be removed. In the example of FIG. 9A, the data-processing apparatus is able to recognize that the user has introduced ambiguity into the process by highlighting only partial sections of the phrase "jumped over the barn," instead of completely highlighting the entire phrase to ensure that the entire phrase is encompassed by the highlighted area. Because of the sensed ambiguity, the data-processing apparatus leaves the text of the highlighted edited region in the electronic document, as shown in S225, but with the text of the highlighted edited region colored in the first color to indicate to the user that the ambiguity was sensed, and the highlighted edited region was not removed.

Figure 9B:
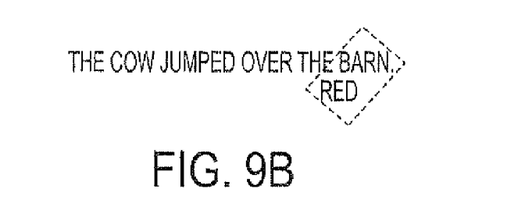

Referring now to FIG. 9B, a scenario is illustrated where a user attempts to edit the hard-copy document by highlighting in the second color the section to be added. However, in this illustrative scenario, the user inadvertently introduces ambiguity into the process by not only by highlighting the word or words to be added, but also portions of other words already contained within the hard-copy document. In the example of FIG. 9B, the data-processing apparatus is able to recognize that the user has highlighted the word to be added, "red," in addition to the word "barn." Because of the sensed ambiguity, the data-processing apparatus adds the text of the highlighted edited region to the electronic document to indicate to the user that the edit was applied, but the text of the highlighted edited region, including both the words "red" and "barn," is colored in the second color to indicate to the user that the word "red" was added and that the ambiguity was sensed, as shown in S245.

Also, although not illustrated in FIG. 9B, the data-processing apparatus is also able to recognize any ambiguity introduced into the process in a scenario where the user does not highlight any of the original text in the hard-copy document, but highlights only partial portions of a word or words to be added. For example, referring again to FIG. 9B for illustrative purposes only, where the user inadvertently highlights only a portion of the word "red" to be added, instead of the entire word "red," and does not highlight any text already contained in the hard-copy document (i.e., any of the words in the phase "The cow jumped over the bain."), the data-processing apparatus is able to recognize the ambiguity with respect to the word "red." Thus, the data-processing apparatus then adds the text of the highlighted edited region, the word "red," to the electronic document to indicate to the user that the edit was applied, but the text of the highlighted edited region to be added is colored in the second color to indicate to the user that the ambiguity was sensed, as shown in S245.

Figure 10A:
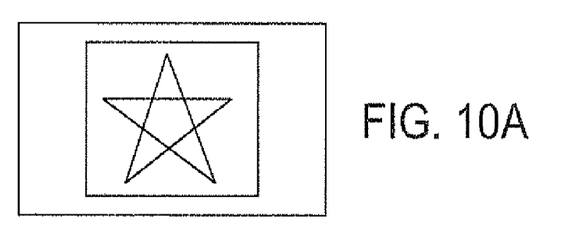
FIGS. 10A and 10B illustrate the highlighted edited region may also include a figure to be deleted or added, in accordance with another exemplary embodiment.
Figure 10B:
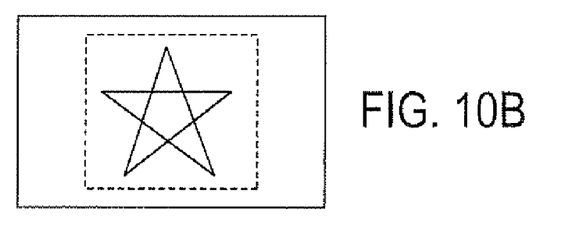

Referring now to FIGS. 10A and 10B, the highlighted edited region may also include a figure to be deleted or added, as determined by the user. FIG. 10A shows, for example, a star completely highlighted in a first color (the solid box indicating a solid highlighted edited region being highlighted in a first color). The data processing apparatus may recognize the highlighted edited region, containing the star, being highlighted in a first color, and take appropriate steps to remove the star from the electronic document. Conversely, FIG. 10B shows, for example, a star completely highlighted in a second color (the dashed box indicating a solid edited region highlighted in a second color). The data processing apparatus may recognize the highlighted edited region, containing the star, being highlighted in a second color, and take appropriate steps to add the star to the electronic document. It will be appreciated by those skilled in the art that any diagram or figure enclosed completely by a highlighted edited region may be deleted from or added to the electronic document by highlighting the highlighted edited region in the first color or second color, respectively.

Figure 11:
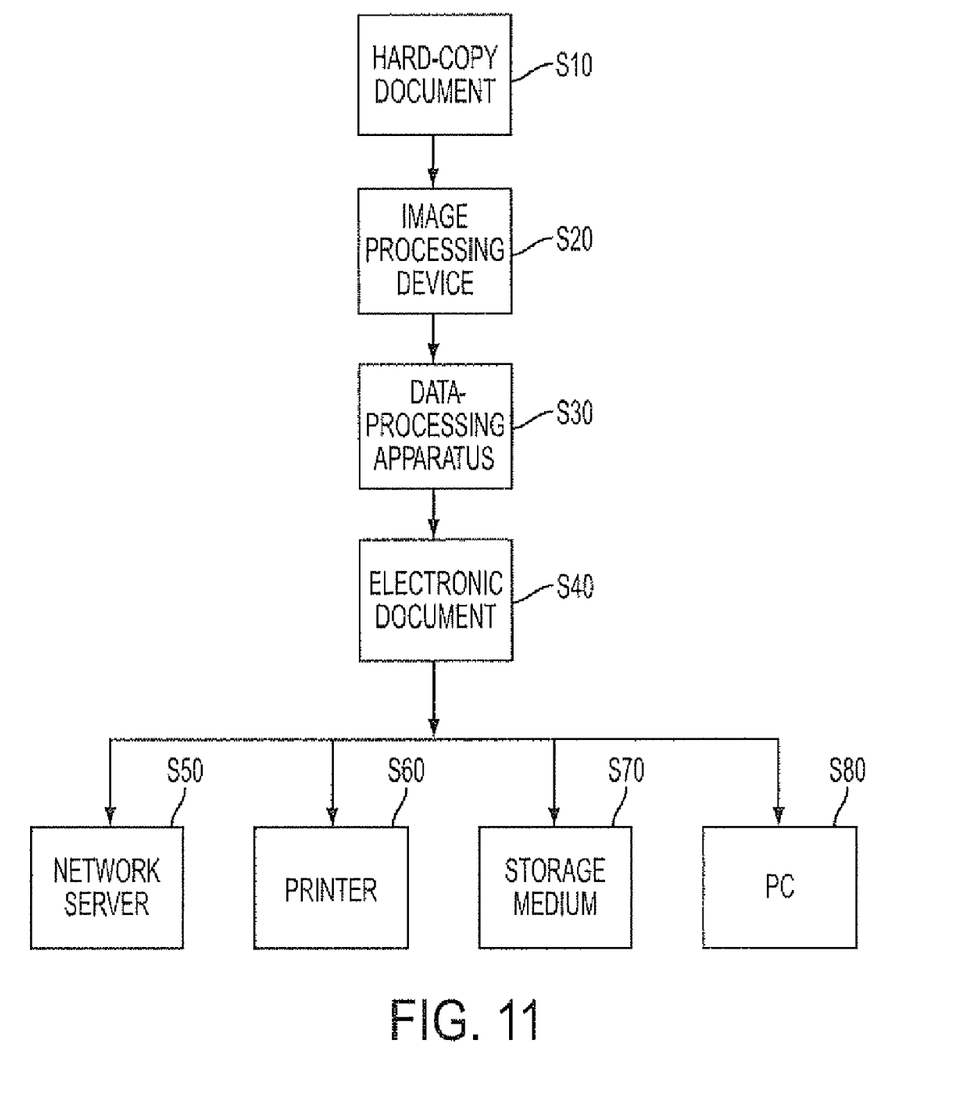
FIG. 11. is a block diagram showing the process by an electronic document with edits applied is created from a hard-copy document containing edits.

Referring now to FIG. 11, the hard-copy document, as shown at S10 can be electronically read by an image processing device, as shown at S20. The image processing device may be sent to a data-processing device, as shown at S30, such as a personal computer. The data-processing device may carry out the above-mentioned process to produce the electronic document, as shown at S40. After the data-processing device produces the electronic document, the electronic document may be output by any means desired by the user, such as, for example, over the internet to a network server, as shown at S50, a printer, as shown at S60, a storage medium, as shown at S70, or another personal computer, as shown at S80.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method of creating an electronic document from a hard-copy document, the method comprising:
   electronically reading the hard-copy document including a highlighted edited region using an image processing device;
   at least one of extracting, moving or adding the highlighted edited region, wherein the highlighted edited region to be extracted is highlighted in a first color, and the highlighted edited region to be added is highlighted in a second color, and wherein the second color highlighted edited region is added or moved at a location where a first color highlighted edited region was extracted; and
   outputting the electronic document after the at least one of extracting, moving, or adding is accomplished.

2. The method of claim 1, further comprising:
   recognizing the highlighted edited region; and
   determining whether the highlighted edited region is a region of original text to be extracted, or a region of new text to be added.

3. The method of claim 1, wherein the highlighted edited region is disposed at any location on the hard-copy document.

4. The method of claim 2, further comprising:
   determining whether the highlighted edited region is a region of original diagrams to be extracted or a region of new diagrams to be added.

5. The method of claim 1, wherein the outputted electronic document contains text in the second color, the text in the second color representing text that was highlighted in the second color.

6. A system for creating an electronic document from a hard-copy document, the system comprising:
   electronic reader for reading the hard-copy document that includes a highlighted edited region;
   means for at least one of extracting, moving or adding the highlighted edited region based on predetermined criteria, wherein the highlighted edited region to be extracted is highlighted in a first color, and the highlighted edited region to be added is highlighted in a second color, and wherein the second color highlighted edited region is added or moved at a location where a first color highlighted edited region was extracted; and
   means for outputting the electronic document after the at least one of extracting, moving, or adding is accomplished.

7. The system of claim 6, further comprising:
   means for recognizing the highlighted edited region; and
   means for determining whether the highlighted edited region is a region of original text to be extracted, or a region of new text to be added.

8. The system of claim 6, wherein the highlighted edited region is disposed at any location on the hard-copy document.

9. The method of claim 7, further comprising:
   means for determining whether the highlighted edited region is a region of original diagrams to be extracted or a region of new diagrams to be added.

10. The system of claim 6, wherein the outputted electronic document contains text in the second color, the text in the second color representing text that was highlighted in the second color.

11. A xerographic device comprising the system of claim 6.

12. The method of claim 1, wherein the entire hard-copy document is outputted as the outputted electronic document after the at least one of the extracting, moving, or adding is accomplished.

13. The system of claim 6, wherein the entire hard-copy document is outputted as the outputted electronic document after the at least one of the extracting, moving, or adding is accomplished.

* * * * *